US012516576B2

(12) United States Patent
Krogh

(10) Patent No.: US 12,516,576 B2
(45) Date of Patent: Jan. 6, 2026

(54) DRILL PIPE CLEANING SYSTEMS AND METHODS

(71) Applicant: RIGTOOLS ApS, Randers SØ (DK)

(72) Inventor: Per Krogh, Randers NØ (DK)

(73) Assignee: RIGTOOLS ApS, Randers SØ (DK)

( * ) Notice: Subject to any disclaimer, the term of this patent is extended or adjusted under 35 U.S.C. 154(b) by 371 days.

(21) Appl. No.: 18/132,083

(22) Filed: Apr. 7, 2023

(65) Prior Publication Data

US 2023/0323736 A1 Oct. 12, 2023

(30) Foreign Application Priority Data

Apr. 11, 2022 (DK) ........................... PA 2022 00348

(51) Int. Cl.

*E21B 17/00* (2006.01)
*B08B 9/023* (2006.01)
*E21B 37/02* (2006.01)
*E21B 41/00* (2006.01)

(52) U.S. Cl.

CPC ............ *E21B 17/006* (2013.01); *B08B 9/023* (2013.01); *E21B 37/02* (2013.01); *E21B 41/0078* (2013.01)

(58) Field of Classification Search

CPC ........... B08B 9/02; B08B 9/023; B08B 9/021; B08B 1/165; B08B 1/20; E21B 17/006; E21B 37/02; E21B 41/0078; E02B 17/0034

USPC ... 15/104.03, 104.04, 256.2, 256.52, 256.53, 15/256.6

See application file for complete search history.

(56) References Cited

U.S. PATENT DOCUMENTS

| | | | | |
|---|---|---|---|---|
| 1,899,379 | A | 2/1933 | Adams | |
| 2,576,912 | A | 12/1951 | Johan | |
| 5,615,696 | A | 4/1997 | Lawler | |
| 2001/0032659 | A1 | 10/2001 | Wang et al. | |
| 2004/0184844 | A1* | 9/2004 | Song | G03G 15/10 399/297 |
| 2012/0272897 | A1* | 11/2012 | Bamford | B05B 13/0421 118/500 |
| 2015/0285949 | A1* | 10/2015 | Macquin | G01V 13/00 134/6 |
| 2021/0229137 | A1* | 7/2021 | Van Voorhis | B05C 5/0241 |

FOREIGN PATENT DOCUMENTS

| | | | | |
|---|---|---|---|---|
| CN | 205422650 | U | 8/2016 | |
| CN | 108380598 | A | 8/2018 | |
| CN | 113522890 | A | 10/2021 | |
| CN | 113695318 | A | 11/2021 | |
| EP | 2340896 | A1 | 7/2011 | |
| EP | 2955322 | A2 | 12/2015 | |
| JP | S54136761 | U | 9/1979 | |
| WO | 2015044074 | A1 | 4/2015 | |
| WO | 20211567 | A1 | 6/2023 | |
| WO | WO-2023121474 | A1 * | 6/2023 | B08B 13/00 |

* cited by examiner

*Primary Examiner* — Brian D Keller
*Assistant Examiner* — Alberto Saenz
(74) *Attorney, Agent, or Firm* — Elevated IP, LLC

(57) ABSTRACT

A drill pipe cleaning system is configured for cleaning external surfaces of sections of a drill pipe to remove earth, drilling mud, and other solid and/or liquid compounds while a drill pipe is being handled in a wellbore or on a drilling rig. The drill pipe cleaning system includes a cleaning ring provided with a ring opening, for receiving the drill pipe, and a number of cleaning belts arranged to engage with and scrape the outer surface of the drill pipe.

20 Claims, 12 Drawing Sheets

Fig. 1A
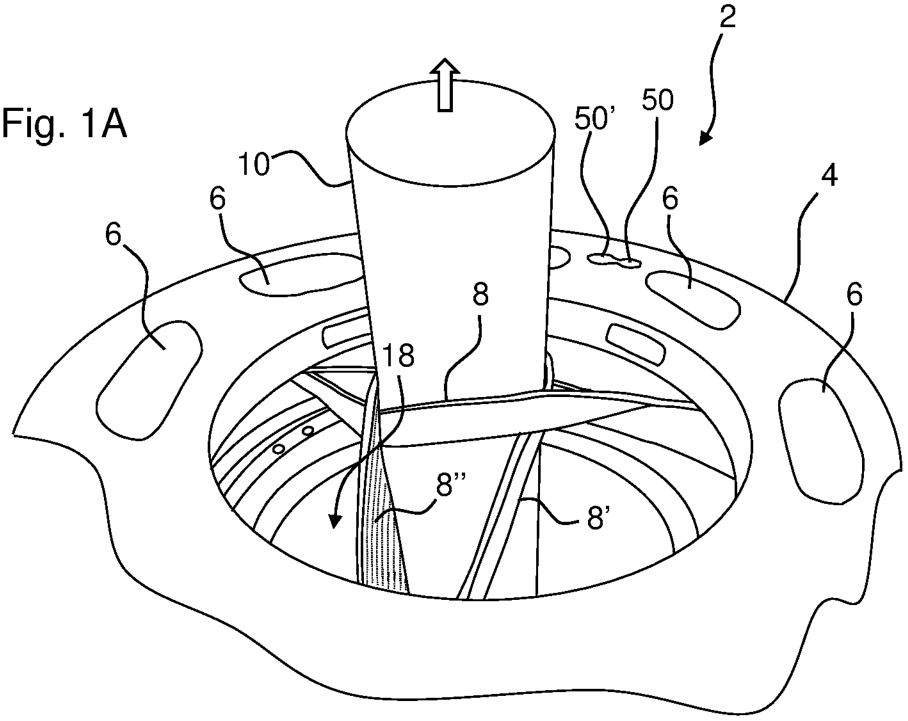
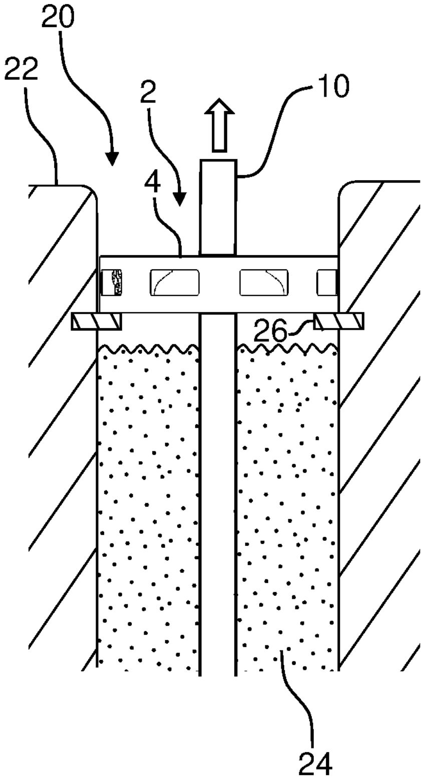
Fig. 1B

Fig. 3A
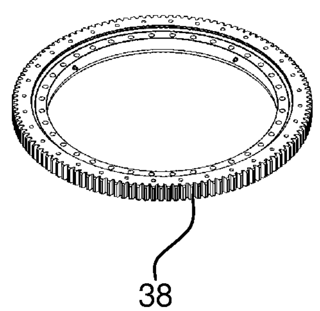
Fig. 3B
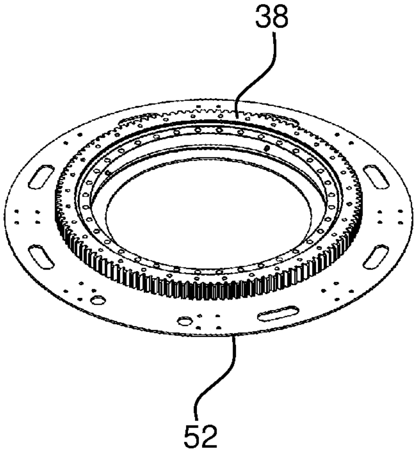
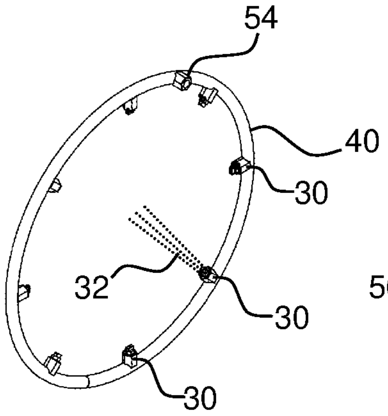
Fig. 3C
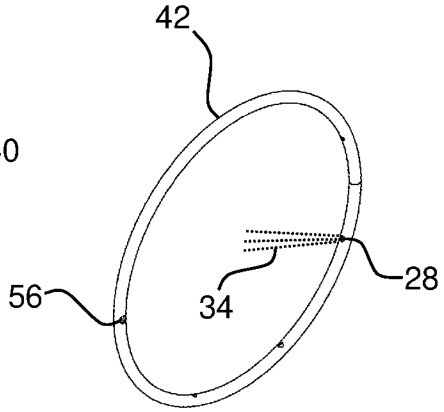
Fig. 3D

Fig. 4A
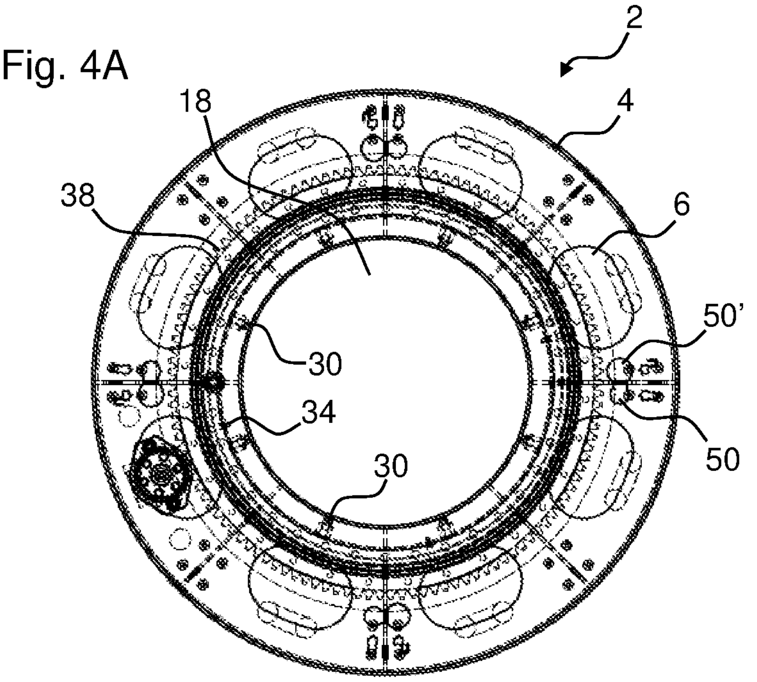
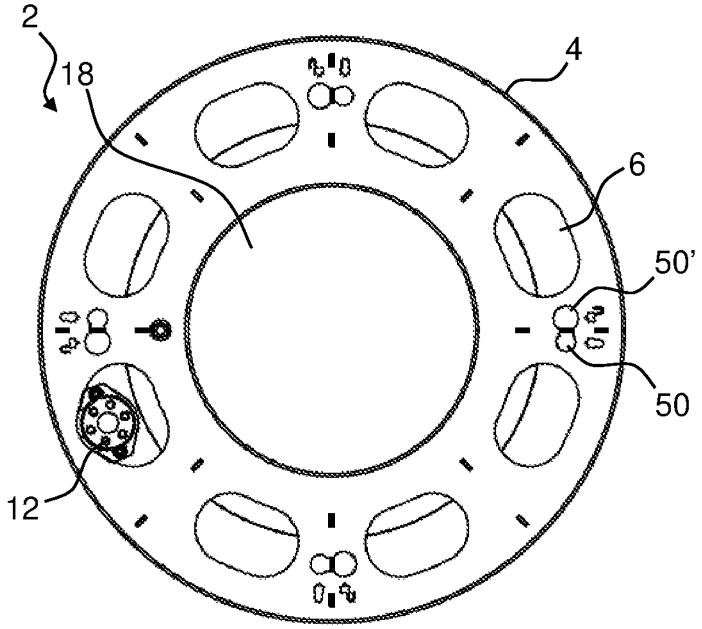
Fig. 4B

Fig. 6A
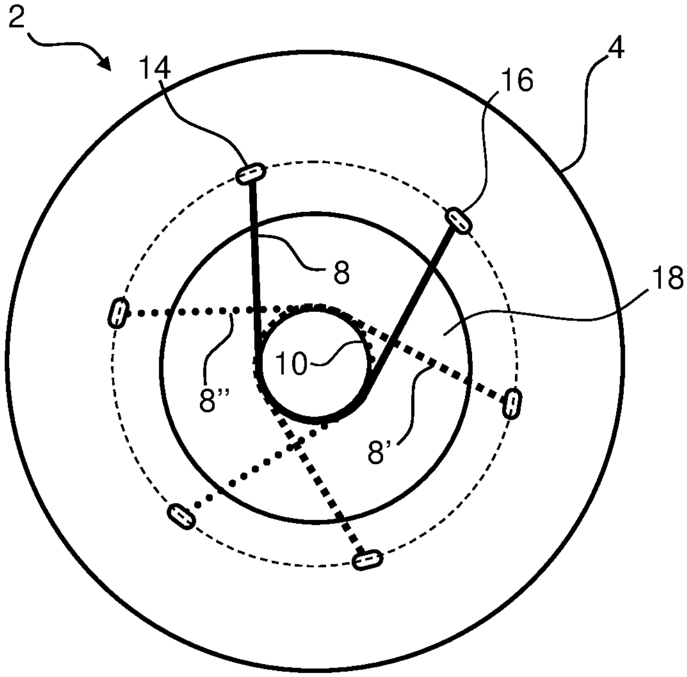
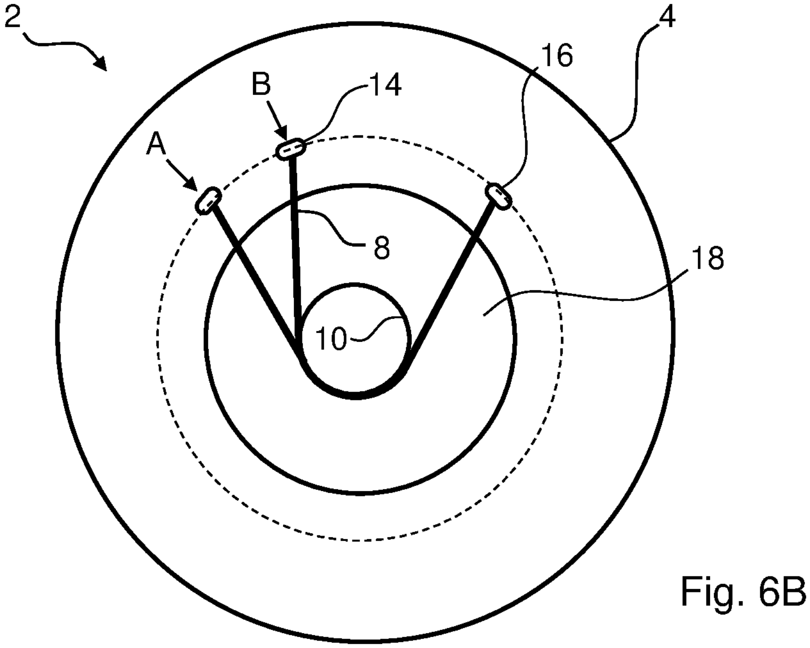
Fig. 6B

Fig. 7A
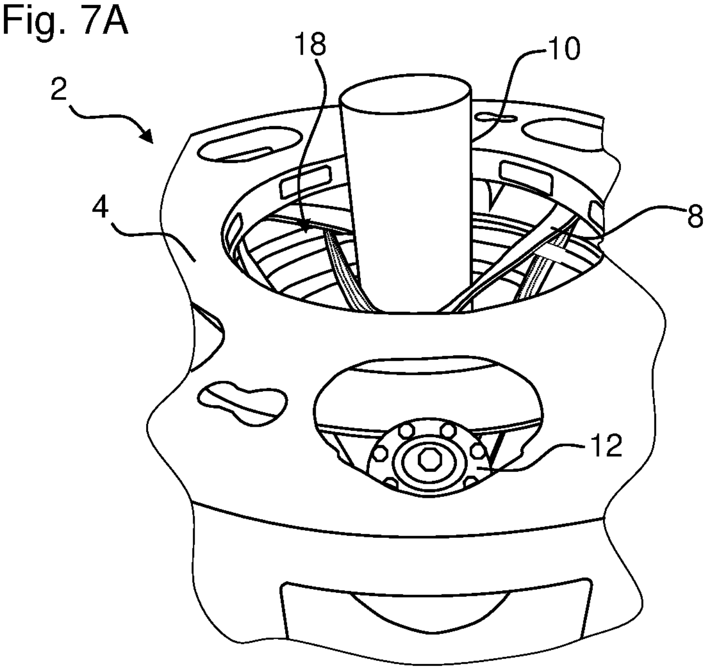
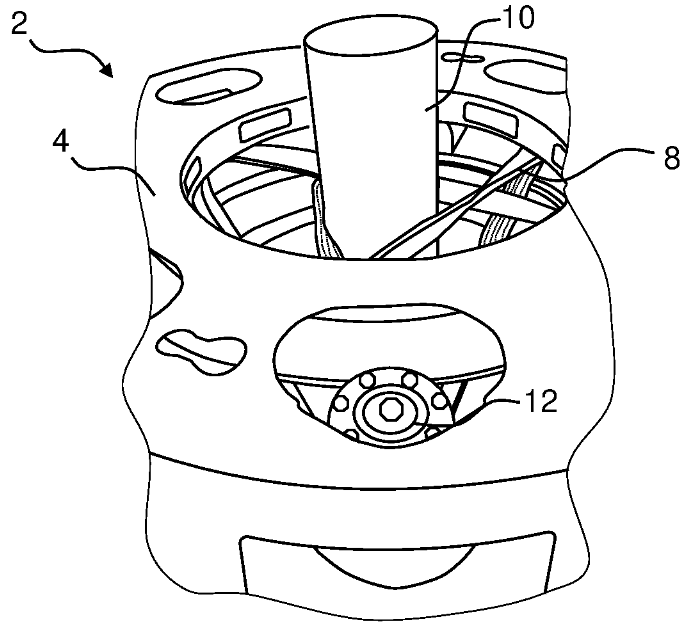
Fig. 7B

Fig. 8A
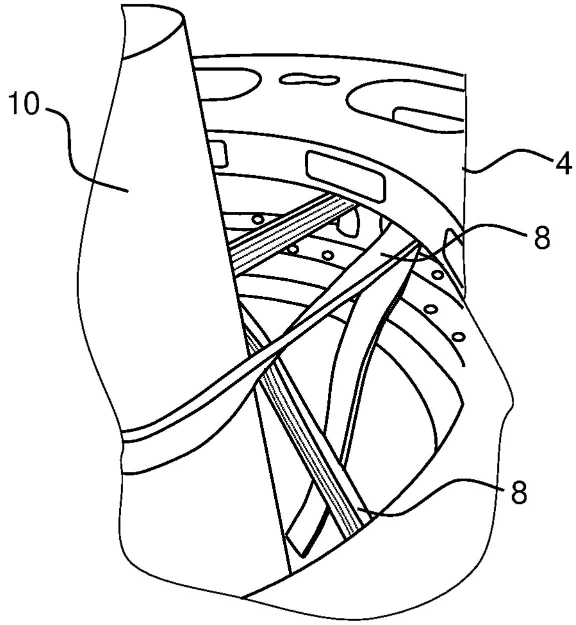
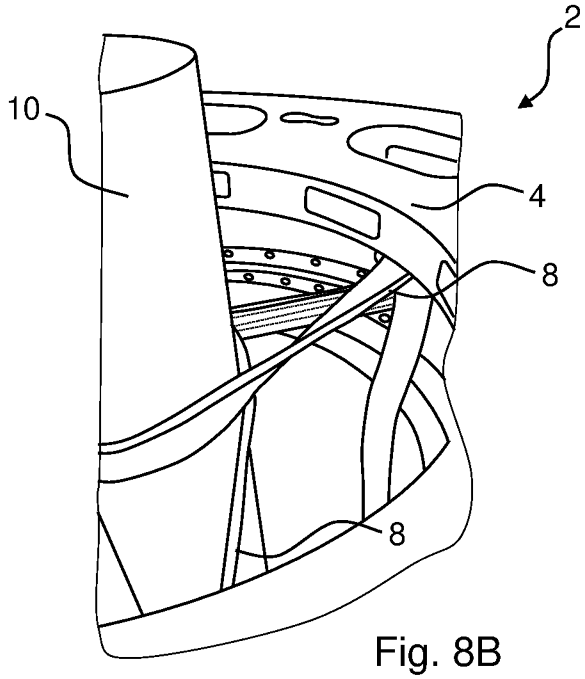
Fig. 8B

Fig. 12A
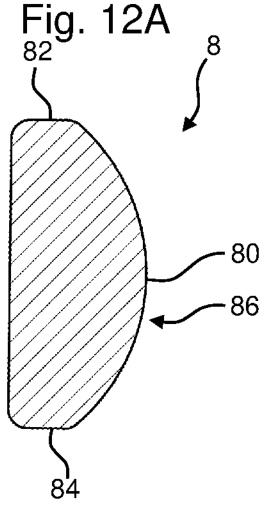
Fig. 12B
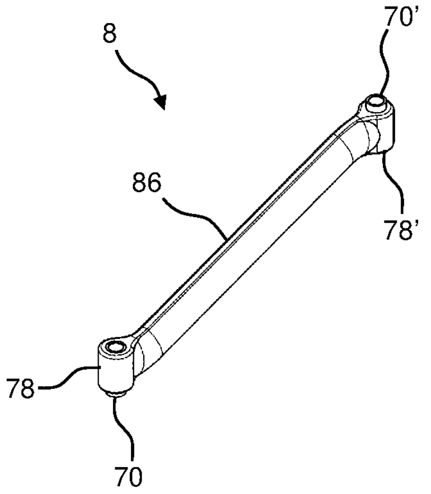
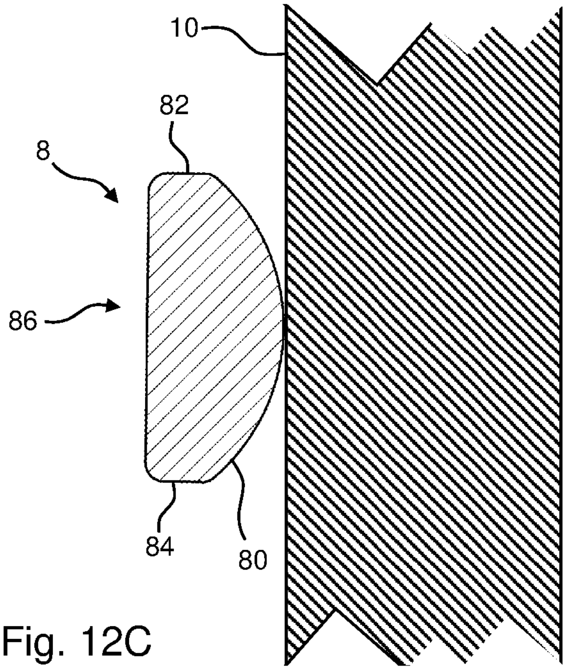
Fig. 12C

DRILL PIPE CLEANING SYSTEMS AND METHODS

CROSS-REFERENCE TO RELATED APPLICATIONS

This application claims the benefit of and priority to Danish Application No. PA 2022 00348, filed Apr. 11, 2022, which is hereby incorporated by reference in its entirety.

FIELD OF INVENTION

The present invention relates to drill pipe cleaning systems and methods for cleaning of external surfaces of sections of a drill pipe, a tubing or a casing string to remove earth, drilling mud, and other solid and/or liquid compounds while the drill pipe, tubing or casing string is being handled (e.g. pulled out) in a wellbore or on a drilling rig.

BACKGROUND

Wellbores are widely used to provide oil and natural gas. Oil wells and natural gas are typically drilled into the earth in order to allow the underground oil or gas deposits to be forced to the surface along the well bore. The oil or gas can reach the surface level either by the underground pressure or by using one or more pumps. A wellbore is drilled from a drilling rig by means of a rotating drilling bit. When the rotating drilling bit is driven into the earth, it will cut through layers of rocks and soil by using a continuous flow of compressed drilling mud.

During the drilling process a number of hollow metallic drill pipes, tubing or casing string are used. In the following description, the term “drill pipe” is to be understood as drill pipe, tubing or a casing string. Drill pipes are inserted within the drilled bore to prevent the walls of drilled bore from collapsing. The drill bores should be kept clean by efficiently removing mud, rock debris and dirt from the outside of the drill pipes to maintain reliable functioning of the in-well equipment.

It is known to apply ring-shaped cleaning devices provided with a centrally arranged ring opening, wherein the cleaning devices are configured to surround a drill pipe. These prior art cleaning devices are typically equipped with a plurality of nozzles arranged and configured to spray a pressurized fluid towards the drill pipe in order to dislodge mud, dirt or rock debris from the outside surface of the drill pipe. These tools are, however, not very efficient in removing mud and dirt from the outside walls of drill pipes.

U.S. Pat. No. 1,899,379 A discloses a portable pipe cleaning machine designed to clean pipes. The pipe cleaning machine comprises an annular rotor head adapted to encircle a pipe to be cleaned. The pipe cleaning machine comprises a plurality of chains that are arranged to thoroughly cleanse the exterior surface of the pipe. This solution, however, is not suitable for cleaning pipes having a diameter that differs the small range the pipe cleaning machine is designed to clean. Moreover, the chains do not provide an efficient cleaning.

Accordingly, it is desired to improve the prior art cleaning devices in order to provide a more efficient cleaning device.

BRIEF DESCRIPTION

It is an object of the present invention to provide a cleaning device that can clean drill pipes in a more efficient manner than the prior art cleaning devices.

A drill pipe cleaning system according to the present disclosure is a drill pipe cleaning system configured for cleaning of external surfaces of sections of a drill pipe to remove earth, drilling mud, and other solid and/or liquid compounds while the drill pipe is being handled in a wellbore or on a drilling rig, wherein the drill pipe cleaning system comprises a cleaning ring provided with a ring opening, wherein the ring opening is configured to receive the drill pipe, wherein the drill pipe cleaning system comprises a number of cleaning belts arranged to engage with and hereby scrape the outer surface of the drill pipe, wherein each cleaning belt is mounted to a first mounting structure and a second mounting structure, respectively, wherein the first mounting structure and a second mounting structure are moveably mounted with respect to each other, wherein first mounting structure and or the second mounting structure is moveable between a first position A and a second position B.

Hereby, upon raising the drill pipe, the cleaning belts will scrape and hereby clean the outside surface of the drill pipe. Accordingly, it is possible to provide a cleaning device that can clean drill tubes in a more efficient manner than the prior art cleaning devices. Moreover, it is possible to adjust the tension of the cleaning belts. This is a major advantage and makes it possible to provide the most optimum cleaning and reduce wear and the risk of damaging the cleaning belts.

A drill pipe cleaning system disclosed herein is designed for cleaning of external surfaces of sections of a drill pipe. It is intended to carry out the cleaning while the drill pipe is being handled in a wellbore or on a drilling rig. The cleaning is intended to remove earth, drilling mud, and other solid and/or liquid compounds.

The term “being handled” includes the action of pulling out. Accordingly, a drill pipe cleaning system disclosed herein is designed for cleaning of external surfaces of sections of a drill pipe, tubing or a casing string that is being pulled out. Accordingly, the term “drill pipes” includes drill pipes, casing and tubular—all pipes used in a wellbore or on a drilling rig.

A drill pipe cleaning system comprises a cleaning ring provided with a ring opening. The ring opening is larger than the drill pipe to allow the drill pipe to extend through the ring opening.

The ring opening is configured to receive the drill pipe. In an embodiment, the diameter of the ring opening is at least twice as large as the diameter of a standard drill pipe.

The drill pipe cleaning system comprises a number of cleaning belts arranged to engage with and hereby scrape the outer surface of the drill pipe. Hereby, it is possible to provide a drill pipe cleaning system that is very flexible with respect to the dimensions (diameter) of the drill pipe.

Moreover, a very efficient cleaning can be provided by letting the one or more cleaning belts scrape the outer surface of the drill pipe.

In an embodiment, the cleaning belts are made from an elastomer.

In an embodiment, the cleaning belts are made from rubber.

In an embodiment, the cleaning belts are made from an elastomer and comprise one or more reinforcement structures provided to increase the lifetime of the cleaning belts and make them stronger and wear resistant.

In an embodiment, a drill pipe cleaning system comprises a single cleaning belt.

In an embodiment, a drill pipe cleaning system comprises two cleaning belts.

In an embodiment, a drill pipe cleaning system comprises three cleaning belts.

In an embodiment, a drill pipe cleaning system comprises four or more cleaning belts.

In an embodiment, the cleaning belts are detachably attached to the cleaning ring.

In an embodiment, a drill pipe cleaning system comprises a plurality of vertically displaced cleaning belts. Hereby it is meant that the cleaning belts are arranged in such a manner that the cleaning belts are brought into engagement with the drill pipe at different vertical positions. Accordingly, an efficient cleaning performance can be accomplished by the cleaning belts.

The cleaning belts may be attached to the cleaning ring at attachment points that are arranged in the same vertical position. In an embodiment, the cleaning belts are attached to the cleaning ring at attachment points, wherein the attachment points of different cleaning belts are arranged at different vertical positions.

In an embodiment, the cleaning ring comprises one or more liquid spraying nozzles arranged and configured to spray a liquid towards the drill pipe. Liquid spraying nozzles are used to clean structures that cannot be cleaned to a sufficient degree using the cleaning belts.

In an embodiment, the liquid spraying nozzles are arranged along a liquid guiding, tubular ring-shaped member. Hereby, it is possible to build the liquid spraying nozzles into the cleaning ring in a practical and efficient manner.

In an embodiment, the cleaning ring comprises one or more air spraying nozzles arranged and configured to spray air towards the drill pipe. Hereby, it is possible to provide an even more efficient cleaning of drill pipes.

The term air includes ambient air, such as pressurized ambient air. In an embodiment, the air spraying nozzles are arranged and configured to spray ambient air towards the drill pipe.

In an embodiment, the air spraying nozzles are arranged along an air guiding, tubular ring-shaped member. Hereby, it is possible to build the air spraying nozzles into the cleaning ring in a practical and efficient manner.

In an embodiment, a plurality of openings is arranged in an axial surface of the cleaning ring. Hereby, earth, drilling mud, and other solid and/or liquid compounds received by the cleaning ring can exit the cleaning ring through these openings.

In an embodiment, the cleaning ring comprises a rotatably mounted toothed wheel and a motor having a gear that is engagingly connected to the teeth of the toothed wheel. Hereby, the motor can rotate the toothed wheel. This rotational motor can be used for the purpose of tightening the cleaning belts.

In an embodiment, the motor is a pneumatic motor. In an embodiment, the motor is a hydraulic motor. In an embodiment, the motor is an electric motor.

In an embodiment, the drill pipe cleaning system comprises a control unit arranged and configured to control the activity of the motor. Hereby, it is possible to control the drill pipe cleaning system in an easy and useful manner. The term "control the activity" includes turning on and turning off. In an embodiment, the control unit is configured to regulate the speed of the motor.

In an embodiment, the cleaning ring comprises a tensioning assembly arranged and configured to adjust the tension of the cleaning belts. Hereby, the tensioning assembly can increase the tension of the cleaning belts.

In an embodiment, the cleaning ring comprises a tensioning assembly arranged and configured to decrease the tension of the cleaning belts. Hereby, the tensioning assembly can decrease the tension of the cleaning belts.

In an embodiment, the cleaning ring comprises a tensioning assembly arranged and configured to increase the tension of the cleaning belts. Hereby, the tensioning assembly can increase the tension of the cleaning belts.

In an embodiment, the tightening tensioning assembly comprises a first mounting structure and a second mounting structure, wherein the first mounting structure is used to attach a first end of a cleaning belt to the cleaning ring, wherein the second mounting structure is used to attach a second end of a cleaning belt to the cleaning ring, wherein the first mounting structure is moveably mounted to the second mounting structure and/or the second mounting structure is moveably mounted to the first mounting structure.

In an embodiment, the drill pipe cleaning system comprises a handling tool having one or more attachment elements configured to be mechanically attached to the cleaning ring, wherein the cleaning ring comprises at least one attachment structure arranged and configured to be brought into engagement with the attachment elements of the handling tool. Hereby, the handling tool can be used to mount the drill pipe cleaning system in a wellbore in a safe and user-friendly manner.

In an embodiment, the attachment elements of the handling tool are formed as male structures, wherein the attachment structures of the cleaning ring are formed as female structures (openings), wherein the attachment structures of the cleaning ring are formed as a small opening and a large opening, wherein the first small opening and the large opening are connected to each other by an overlapping portion.

In an embodiment, the cleaning ring comprises two halves that are hinged together.

In an embodiment, the first mounting structure and/or the second mounting structure is moveable between a first position A and a second position B.

A cleaning belt according to the present disclosure is a cleaning belt suitable for use in a drill pipe cleaning system according to the disclosure, the cleaning belt comprising:

- a first end portion, in which a first bushing is arranged; and
- a second end portion, in which a second bushing is arranged, wherein the cleaning belt comprises a cleaning section extending between the first end portion and the second end portion.

The cleaning belt makes it possible to provide an efficient cleaning of drill pipes.

In an embodiment, a cylindrical pin replaces each of the bushings.

In an embodiment, the bushings are formed as cylindrical tubular structures that are suitable for being used to attach the cleaning belt to corresponding mounting structures.

In an embodiment, the first end portion has a first longitudinal axis X, wherein the second end portion has a second longitudinal axis Y, wherein each bushing extends perpendicular to longitudinal axis X, Y of the corresponding end portion.

In an embodiment, the bushings protrude from the end portions.

In an embodiment, each bushing protrudes only in one direction from the end portion in which the bushing is mounted.

In an embodiment, the cleaning section comprises a single arced contact member, wherein the arced contact member is configured to be brought into contact with and hereby clean the drill pipe.

In an embodiment, the cleaning belt comprises an upper edge and a lower edge, wherein the arced contact member extends between the upper edge and the lower edge.

In an embodiment, an upper edge and a lower edge extend parallel to each other.

In an embodiment, the upper edge and the lower edge are straight.

In an embodiment, the arced contact member is circularly arced, wherein the radius of curvature of the arced contact member is in the range 20-40 mm.

In an embodiment, the arced contact member is circularly arced, wherein the radius of curvature of the arced contact member is in the range 25-35 mm.

In an embodiment, the cleaning section has a longitudinal axis Z, wherein the angle θ between the longitudinal axis Z of the cleaning section and the longitudinal axis X, Y of the corresponding end portion is in the range 10-40 degrees.

In an embodiment, the cleaning section has a longitudinal axis Z, wherein the angle θ between the longitudinal axis Z of the cleaning section and the longitudinal axis X, Y of the corresponding end portion is in the range 15-30 degrees.

An assembly according to the disclosure comprises a cleaning belt according to the disclosure and a drill pipe cleaning system according to the disclosure.

In an aspect, a method of cleaning an exterior surface of a drill pipe comprises providing a drill pipe cleaning system as disclosed herein around a drill pipe and drawing the drill pipe through one or more cleaning belts arranged within a cleaning ring of the drill pipe cleaning system.

In an embodiment, a method of cleaning an exterior surface of a drill pipe further comprises adjusting a tension of the one or more cleaning belts and/or spraying air or liquid onto a surface of the drill pipe.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 1A shows a perspective top view of a portion of a drill pipe cleaning system according to an embodiment;

FIG. 1B shows a side view of a drill pipe cleaning system according to an embodiment arranged in a wellbore of a drilling rig;

FIG. 3A shows a toothed wheel of a cleaning ring of a drill pipe cleaning system according to an embodiment;

FIG. 3B shows the toothed wheel shown in FIG. 3A placed on a bottom plate;

FIG. 3C shows a tubular ring-shaped member according to an embodiment;

FIG. 3D shows another tubular ring-shaped member according to an embodiment;

FIG. 4A shows a top view of a drill pipe cleaning system according to an embodiment;

FIG. 4B shows a top view of the drill pipe cleaning system shown in FIG. 4A;

FIG. 6A shows a schematic top view of a drill pipe cleaning system according to an embodiment;

FIG. 6B shows another schematic top view of a drill pipe cleaning system according to an embodiment;

FIG. 7A shows a perspective top view of a drill pipe cleaning system according to an embodiment arranged in a first configuration;

FIG. 7B shows a perspective top view of the drill pipe cleaning system shown in FIG. 7A arranged in a second configuration;

FIG. 8A shows a perspective top view of a drill pipe cleaning system according to an embodiment arranged in a first configuration;

FIG. 8B shows a perspective top view of the drill pipe cleaning system shown in FIG. 8A arranged in a second configuration;

FIG. 12A shows a cross-sectional view of the cleaning section of the cleaning belt shown in FIG. 11A;

FIG. 12B shows a perspective view of the cleaning belt shown in FIG. 11A; and FIG. 12C shows a cross-sectional view of the cleaning belt shown in FIG. 12A bearing against a drill pipe.

DETAILED DESCRIPTION

Figure 2A:
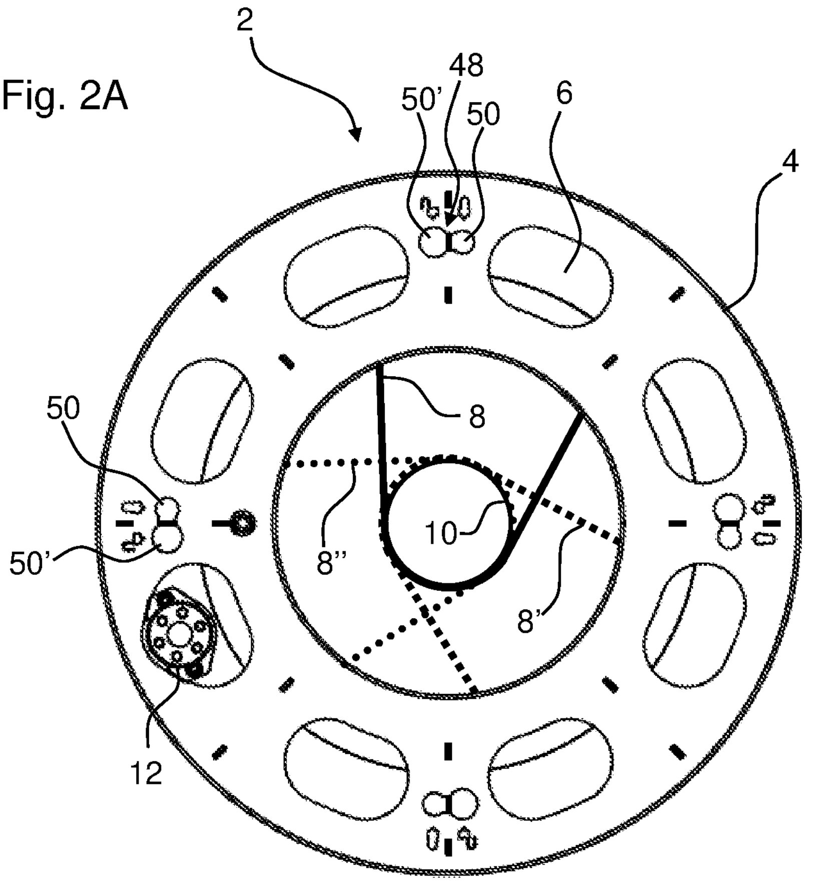
FIG. 2A shows a top view of a drill pipe cleaning system according to an embodiment.

FIG. 1A is a perspective top view of a portion of a drill pipe cleaning system 2 according to an embodiment. The drill pipe cleaning system 2 is configured for cleaning of external surfaces of sections of a drill pipe 10. This cleaning process is accomplished with the purpose of removing earth, drilling mud, and other solid and/or liquid compounds while the drill pipe 10 is being handled in a wellbore or on a drilling rig.

The drill pipe cleaning system 2 comprises a cleaning ring 4 provided with a ring opening 18. The ring opening 18 is centrally arranged and configured to receive the drill pipe 10. Hereby, the cleaning ring 4 will surround the drill pipe 10.

The drill pipe cleaning system 2 comprises a number of cleaning belts 8, 8', 8" arranged to engage with and hereby scrape the outer surface of the drill pipe 10.

Hereby, upon raising the drill pipe 10, the cleaning belts 8, 8', 8" will scrape and thus clean the outside surface of the drill pipe.

The drill pipe cleaning system 2 comprises a plurality of vertically displaced cleaning belts 8, 8', 8". This means that the cleaning belts 8, 8', 8" are arranged in such a manner that the cleaning belts 8, 8', 8" are brought into engagement with the drill pipe 10 at different vertical positions. Hereby, the most efficient cleaning performance can be accomplished by the cleaning belts 8, 8', 8".

In practice, the cleaning belts 8, 8', 8" may be attached to the cleaning ring 4 at attachment points that are arranged at the same vertical position. In an embodiment, the cleaning belts 8, 8', 8" are attached to the cleaning ring 4 at attachment points, wherein the attachment points of different cleaning belts 8, 8', 8" are arranged at different vertical positions.

The cleaning ring 4 comprises an upper plate extending along the axial plane of the cleaning ring 4. A plurality of openings 6 are provided in the upper plate. These openings 6 are designed to allow earth, drilling mud, and other solid and/or liquid compounds to be guided away.

The cleaning ring 4 comprises attachment structures formed as female structures. Each attachment structure is formed as a small opening 50 and a large opening 50', wherein the first small opening 50 and the large opening 50' are connected to each other by an overlapping portion.

FIG. 1B illustrates a side view of a drill pipe cleaning system 2 according to an embodiment arranged in a wellbore 20 of a drilling rig 22. The drill pipe cleaning system 2 is arranged to clean the external surfaces of sections of a drill pipe 10 extending through a section of drilling mud 24. The wellbore 20 contains drilling mud 24 that is used to provide a pressure to prevent formation fluids from entering into the wellbore 20, keep the drill bit (not sown) cool and clean during drilling and carry cuttings out of the hole being drilled.

The drill pipe cleaning system 2 comprises a cleaning ring 4 that is mounted on a support structure 26 that is attached to and protrudes from the side wall of the wellbore 20. The drill pipe cleaning system 2 is arranged and configured to clean the drill pipe 10 when it is moved upwards in the direction indicated by the arrow.

FIG. 2A illustrates a top view of a drill pipe cleaning system 2 according to an embodiment. The drill pipe cleaning system 2 comprises a cleaning ring 4 provided with a centrally arranged ring opening 18. It can be seen that the cleaning ring 4 comprises a top plate and that a plurality of openings 6 are provided in the top plate. The top plate comprises four attachment structures 48 each comprising a small opening 50 and a large opening 50' that are connected to each other by an overlapping portion. The attachment structures 48 are evenly distributed along a circular path extending close to the periphery of the cleaning ring 4. The attachment structures 48 are arranged and configured to receive corresponding attachment elements of a handling tool (see FIG. 5B, FIG. 5E, FIG. 5F and FIG. 5G). The attachment elements are designed to enter a large opening 50' and be brought into a locking position by being displaced clockwise into the corresponding small opening 50.

A drill pipe 10 extends through the ring opening 18. The cleaning ring 4 comprises three cleaning belts 8, 8', 8" arranged to engage with and hereby scrape the outer surface of the drill pipe 10. It is important to emphasize that the cleaning ring 4 may comprise more than three cleaning belts 8, 8', 8" arranged to engage with and hereby scrape the outer surface of the drill pipe 10. Each cleaning belt 8, 8', 8" comprises two ends that are fixed to a first position and a different second position of the cleaning ring 4. At least one of these positions is moveably attached to the cleaning ring 4. Hereby, it is possible to tighten the cleaning belts 8, 8', 8".

It can be seen that the cleaning belts 8, 8', 8" are evenly distributed along the circumference of the cleaning ring 4. Hereby, the most efficient cleaning can be accomplished using the cleaning belts 8, 8', 8". The first cleaning belt 8 is indicated with a solid line. The second cleaning belt 8' is indicated with a dotted line (large dots), while the third cleaning belt 8" is indicated with a dotted line (small dots).

It can be seen that the cleaning ring 4 comprises a motor 12. The motor 12 is arranged and configured to engage and hereby rotate a threated wheel (see FIG. 3A, FIG. 3B and FIG. 4A).

Figure 2B:
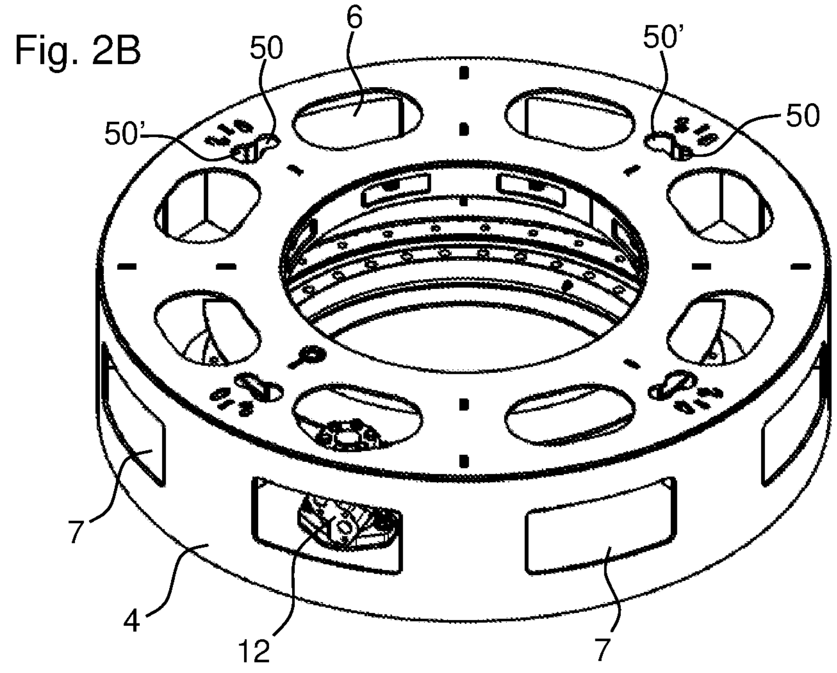
FIG. 2B shows a perspective view of the drill pipe cleaning system shown in FIG. 2A.

FIG. 2B illustrates a perspective view of the drill pipe cleaning system 2 shown in FIG. 2A. It can be seen that the cleaning ring 4 comprises a tangential wall provided with side openings 7. These openings 7 allow for transport of earth, drilling mud, and other solid and/or liquid compounds.

FIG. 3A illustrates a toothed wheel 38 of a cleaning ring of a drill pipe cleaning system according to an embodiment. The toothed wheel 38 comprises teeth provided on the outer side of the toothed wheel 38.

FIG. 3B illustrates the toothed wheel 38 shown in FIG. 3A placed on a bottom plate 52.

FIG. 3C illustrates a liquid guiding, tubular ring-shaped member according to an embodiment. The tubular ring-shaped member is configured to receive and distribute liquid 32. A plurality of liquid spraying nozzles 30 are arranged along the inner periphery of the liquid guiding, tubular ring-shaped member. Each liquid spraying nozzle 30 is arranged and configured to spray liquid 32 towards the center of the liquid guiding, tubular ring-shaped member. Accordingly, when the liquid guiding, tubular ring-shaped member is mounted in a cleaning ring of a drill pipe cleaning system surrounding a drill pipe, each liquid spraying nozzle 30 will spray liquid 32 towards the drill tube.

The liquid guiding, tubular ring-shaped member comprises a liquid inlet 54 configured to receive liquid (e.g. water) from a liquid source. The liquid inlet 54 comprises an axially extending pipe member.

FIG. 3D illustrates an air guiding, tubular ring-shaped member 42 according to an embodiment. The air guiding, tubular ring-shaped member 42 comprises a plurality of air spraying nozzles 28. By the term air is meant any gaseous fluid including ambient air.

The air guiding, tubular ring-shaped member 42 is configured to receive and distribute air 34. The air spraying nozzles 28 are arranged along the inner periphery of the air guiding, tubular ring-shaped member 42. Each air spraying nozzle 28 is arranged and configured to spray air (e.g. pressurized ambient air) 34 towards the center of the air guiding, tubular ring-shaped member 42. When the air guiding, tubular ring-shaped member 42 is mounted in a cleaning ring of a drill pipe cleaning system surrounding a drill pipe, each air spraying nozzle 28 will spray air 28 towards the drill tube. The air guiding, tubular ring-shaped member 42 comprises an air inlet 56 arranged and configured to receive air to be distributed along the air guiding, tubular ring-shaped member 42 and sprayed towards the center of the air guiding, tubular ring-shaped member 42 by the air spraying nozzles 28.

In an embodiment, the air spraying nozzles 28 are evenly distributed along the inner periphery of the air guiding, tubular ring-shaped member 42.

FIG. 4A illustrates a top view of a drill pipe cleaning system 2 according to an embodiment. The drill pipe cleaning system 2 comprises a cleaning ring 4 that corresponds to the one shown in and explained with reference to FIG. 2A and FIG. 2B. The top plate of the cleaning ring 4 is made transparent in order to make the underlying structures visible. FIG. 4B illustrates a top view of the drill pipe cleaning system shown in FIG. 4A in a configuration, in which the top plate of the cleaning ring 4 is not transparent.

It can be seen that the cleaning ring 4 comprises a toothed wheel 38 corresponding to the one shown in and explained with reference to FIG. 3A and FIG. 3B.

The cleaning ring 4 comprises a liquid guiding, tubular ring-shaped member corresponding to the one shown in and explained with reference to FIG. 3C. The cleaning ring 4 also comprises an air guiding, tubular ring-shaped member corresponding to the one shown in and explained with reference to FIG. 3D. Accordingly, the cleaning ring 4 is configured to spray both liquid and gaseous media towards a drill pipe extending through the ring opening 18 of the cleaning ring 4. A motor 12 is arranged adjacent to the toothed wheel 38. The motor comprises a motor shaft and a gear that is attached to the motor shaft. This gear is brought into engagement with the toothed wheel 38. Accordingly, upon rotation of the motor, the gear will force the toothed wheel 38 to rotate.

The top plate of the cleaning ring 4 is provided with a plurality of openings 6. The top plate of the cleaning ring 4 comprises attachment structures formed as female structures. Each attachment structure is formed as a small opening 50 and a large opening 50', wherein the first small opening 50 and the large opening 50' are connected to each other by an overlapping portion.

Figure 5A:
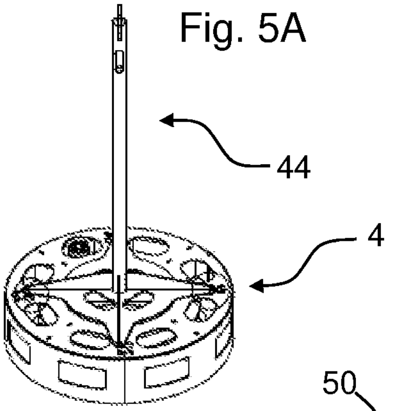
FIG. 5A shows a perspective view of a handling tool attached to a cleaning ring of a drill pipe cleaning system according to an embodiment.

FIG. 5A illustrates a perspective view of a handling tool 44 attached to a cleaning ring 4 of a drill pipe cleaning system according to an embodiment. The handling tool 44 is designed to be detachably attached to the cleaning ring 4 hereby allowing the user to lower the cleaning ring 4 into a wellbore (see FIG. 1B).

Figure 5B:
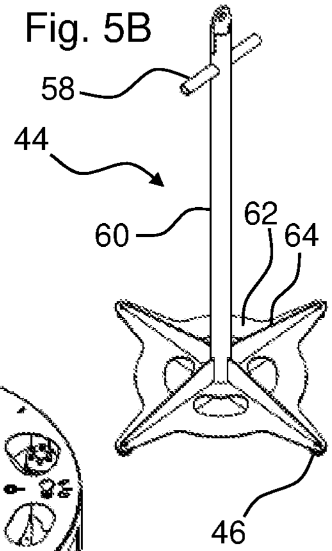
FIG. 5B shows the handling tool shown in FIG. 5A.
Figure 5C:
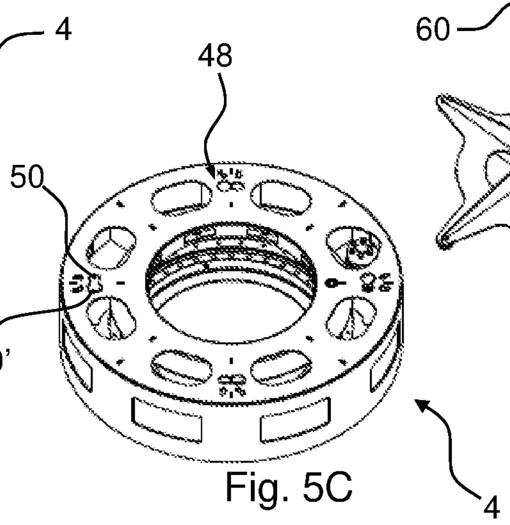
FIG. 5C shows the cleaning ring shown in FIG. 5A.

FIG. 5B illustrates the handling tool 44 shown in FIG. 5A. FIG. 5C illustrates the cleaning ring shown in FIG. 5A.

Figure 5D:
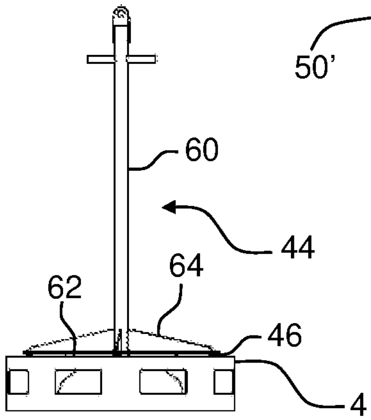
FIG. 5D shows a side view of the handling tool attached to the cleaning ring of the drill pipe cleaning system shown in FIG. 5A.

FIG. 5D illustrates a side view of the handling tool attached to the cleaning ring of the drill pipe cleaning system shown in FIG. 5A.

Figure 5E:
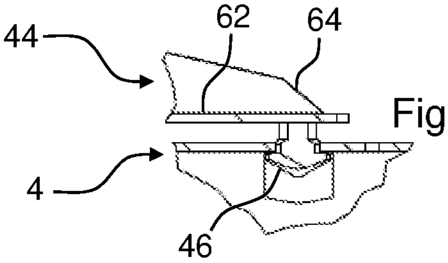
FIG. 5E shows a cross-sectional view of a portion of the handling tool and the cleaning ring shown in FIG. 5A, in a configuration in which the tool is brought into locking engagement with the cleaning ring.

FIG. 5E illustrates a cross-sectional view of a portion of the handling tool and the cleaning ring shown in FIG. 5A, in a configuration in which the tool is brought into locking engagement with the cleaning ring.

Figure 5F:
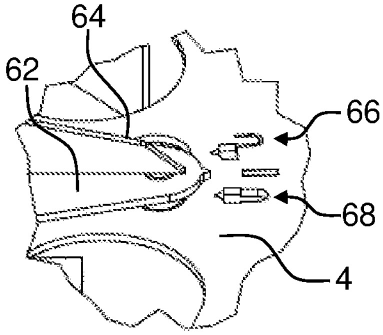
FIG. 5F shows a perspective top view of a portion of the handling tool and the cleaning ring shown in FIG. 5A, in a configuration in which the tool is brought into locking engagement with the cleaning ring.

FIG. 5F illustrates a perspective top view of a portion of the handling tool and the cleaning ring shown in FIG. 5A, in a configuration in which the tool is brought into locking engagement with the cleaning ring.

Figure 5G:
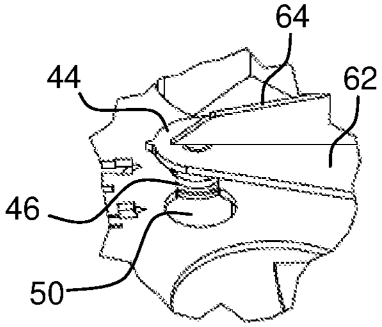
FIG. 5G shows a perspective top view of a portion of the handling tool and the cleaning ring shown in FIG. 5A, in a configuration before the tool is brought into locking engagement with the cleaning ring.

FIG. 5G illustrates a perspective top view of a portion of the handling tool and the cleaning ring shown in FIG. 5A, in a configuration before the tool is brought into locking engagement with the cleaning ring.

It can be seen that the handling tool 44 comprises an elongated rod 60. A handle 58 is attached to the distal portion of the rod 60. A plate portion 62 is provided at the proximal end of the rod 60. Several reinforcement structures 64 are attached to the plate portion 62 in order to increase the stiffness and mechanical strength of the proximal portion of the handling tool 44. A plurality of attachment elements 46 protrude from the bottom side of the plate portion 62.

Each attachment element 46 is arranged and configured to be inserted into the large opening 50' of the attachment structure of the cleaning ring 4. When an attachment element 46 has been inserted into a large opening 50' of the attachment structure of the cleaning ring 4, the handling tool 44 is arranged in an unlocked configuration 66 as indicated with an unlocked padlock shown in FIG. 5F.

From this unlocked configuration 66, the handling tool 44 can be rotated clockwise into a locked configuration 68 as indicated with a locked padlock shown in FIG. 5F. The handling tool 44 is brought from the unlocked configuration 66 to the locked configuration 68 by moving the attachment element 46 into the adjacent small opening 50 by rotating the rod 60 clockwise. Hereby, the attachment element 46 will be locked because the area of the attachment element 46 is larger than the area of the small opening 50.

FIG. 6A illustrates a schematic top view of a drill pipe cleaning system 2 according to an embodiment. The drill pipe cleaning system 2 comprises a cleaning ring 4 provided with a centrally arranged ring opening 18 and three cleaning belts 8, 8', 8''. The cleaning belts 8, 8', 8'' are arranged to engage with and hereby scrape the outer surface of the drill pipe 10. Accordingly, upon raising the drill pipe 10, the cleaning belts 8, 8', 8'' will scrape and thus clean the outside surface of the drill pipe 10.

The first belt 8 is attached to the cleaning ring 4 in a first mounting structure 14 and a second mounting structure 16. The second belt 8' and the third belt 8'' are attached to the cleaning ring 4 in a similar manner. FIG. 6B illustrates another schematic top view of a drill pipe cleaning system 2 according to an embodiment. In FIG. 6B it is indicated that the first mounting structure 14 is moveably arranged and that the first mounting structure 14 can be arranged in a first position A or in a second position B. By moving the first mounting structure 14 from the first position A to the second position B the tension in the first belt 8 is increased. Accordingly, the belt 8 can be tightened by decreasing the distance between the first mounting structure 14 and the second mounting structure 16.

FIG. 7A illustrates a perspective top view of a drill pipe cleaning system 2 according to an embodiment arranged in a first configuration.

FIG. 7B illustrates a perspective top view of the drill pipe cleaning system 2 shown in FIG. 7A arranged in a second configuration, in which the belt 8 has been tightened by decreasing the distance between the first mounting structure and the second mounting structure.

FIG. 8A illustrates a perspective top view of a drill pipe cleaning system 2 according to an embodiment arranged in a first configuration.

FIG. 8B illustrates a perspective top view of the drill pipe cleaning 2 shown in FIG. 8A arranged in a second configuration, in which the tension of the cleaning belt 8 has been increased by moving the first mounting structure and the second mounting structure.

Figure 9A:
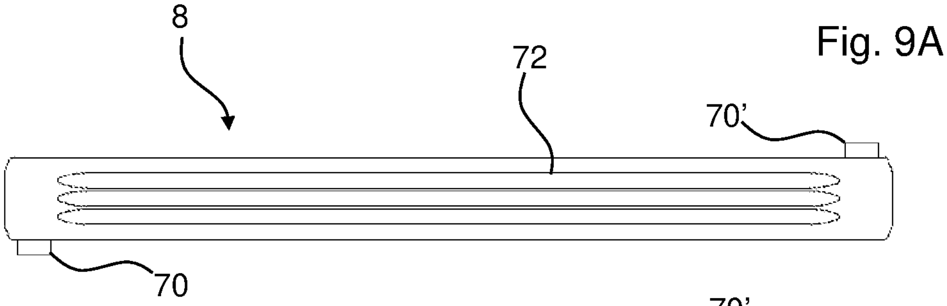
FIG. 9A shows a front view of a cleaning belt of a drill pipe cleaning system according to an embodiment.

FIG. 9A illustrates a front view of a cleaning belt 8 of a drill pipe cleaning system according to an embodiment. FIG.

Figure 9B:
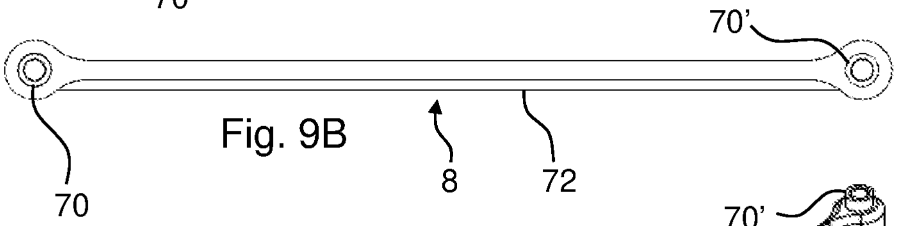
FIG. 9B shows a top view of the cleaning belt shown in FIG. 9A.
Figure 9C:
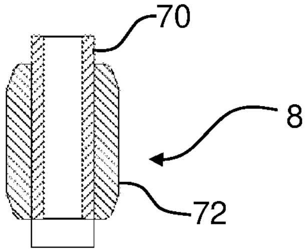
FIG. 9C shows a cross-sectional top view of the cleaning belt shown in FIG. 9A and FIG. 9B.
Figure 9D:
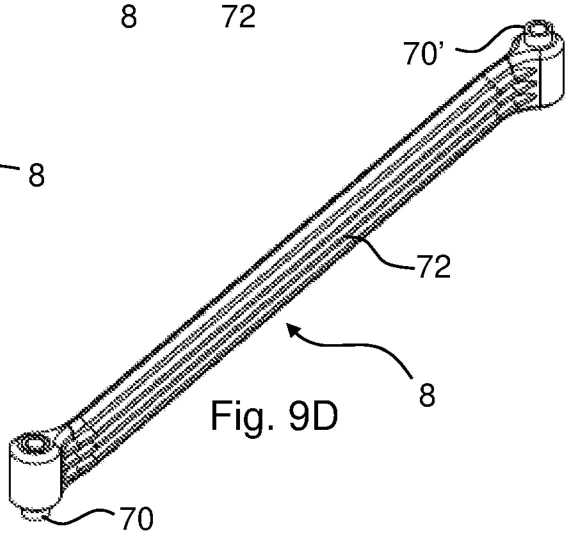
FIG. 9D shows a perspective view of the cleaning belt shown in FIG. 9A.
Figure 9E:
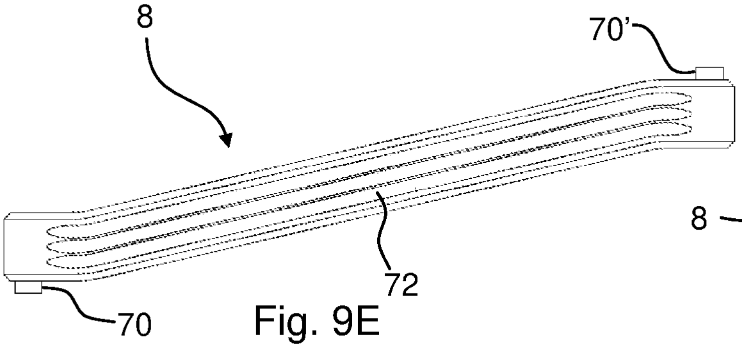
FIG. 9E shows another perspective view of the cleaning belt shown in FIG. 9A.
Figure 9F:
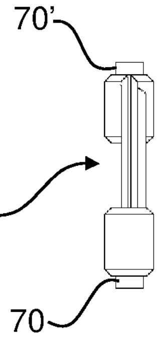
FIG. 9F shows an end view of the cleaning belt shown in FIG. 9A.

9B illustrates a top view of the cleaning belt shown in FIG. 9A. FIG. 9C illustrates a cross-sectional top view of the cleaning belt shown in FIG. 9A and FIG. 9B. FIG. 9D illustrates a perspective view of the cleaning belt shown in FIG. 9A. FIG. 9E illustrates another perspective view of the cleaning belt shown in FIG. 9A and FIG. 9F illustrates an end view of the cleaning belt shown in FIG. 9A.

The cleaning belt 8 comprises a first end, in which a first bushing 70 is arranged. The cleaning belt 8 comprises a second end, in which a second bushing 70' is arranged. The cleaning belt 8 comprises a cleaning section extending between the first end and the second end. The bushings 70, 70' are formed as cylindrical tubular structures that are suitable for being used to mount the cleaning belt 8 to corresponding mounting structures. The bushings 70, 70' extend perpendicular to the length of the cleaning belt 8. It can be seen that the bushings 70, 70' protrude from the remaining part of the ends.

The cleaning section comprises a structured surface provided with a plurality of ridges 72 extending along the length of the cleaning section. The ridges 72 contain material that is suitable for and design to be subject to wear. The ridges 72 protrude from the remaining portion of the cleaning belt 8. Accordingly, the ridges 72 are arranged and configured to scrape and hereby clean a drill pipe, which the cleaning belt 8 is brought into engagement with.

Figure 10A:
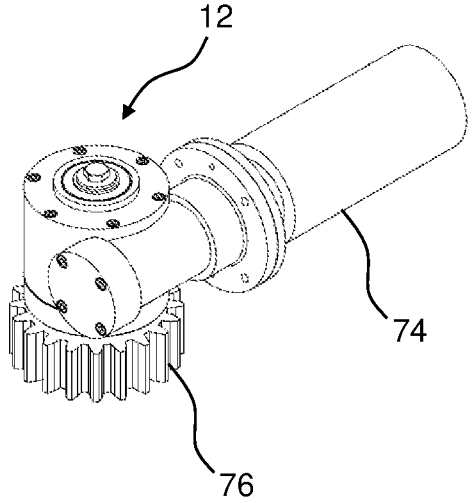
FIG. 10A shows a motor of a cleaning belt of a drill pipe cleaning system according to an embodiment.

FIG. 10A illustrates a motor 12 of a cleaning belt of a drill pipe cleaning system according to an embodiment. The motor 12 is a pneumatic motor 12 that is connected to an air conduit 74. The motor 12 receives compressed air via the air conduit 74. The motor 12 comprises a shaft (not shown) and is arranged and configured to rotate a toothed wheel 76 that is connected to the shaft of the motor 12.

Figure 10B:
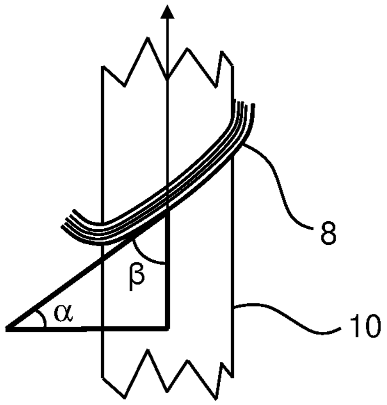
FIG. 10B shows a cleaning belt of a drill pipe cleaning system according to an embodiment.

FIG. 10B illustrates a cleaning belt 8 of a drill pipe cleaning system according to an embodiment. The cleaning belt 8 is brought into engagement with the outer surface of the drill pipe 10. Accordingly, the cleaning belt 8 is capable of scraping and hereby cleaning the outer surface of the drill pipe 10. It can be seen that the cleaning belt 8 extends between a first vertical position and a second vertical position. Accordingly, the angle β between the cleaning belt 8 and longitudinal axis X of the drill pipe 10 differ from 90 degrees. In FIG. 10B the angle α between the longitudinal axis X of the drill pipe 10 and a line extending perpendicular to the longitudinal axis X, is indicated. In an embodiment, the angle β is in the range 10-85 degrees. In an embodiment, the angle β is in the range 20-85 degrees. In an embodiment, the angle β is in the range 45-85 degrees. In an embodiment, the angle β is in the range 60-80 degrees.

Figure 10C:
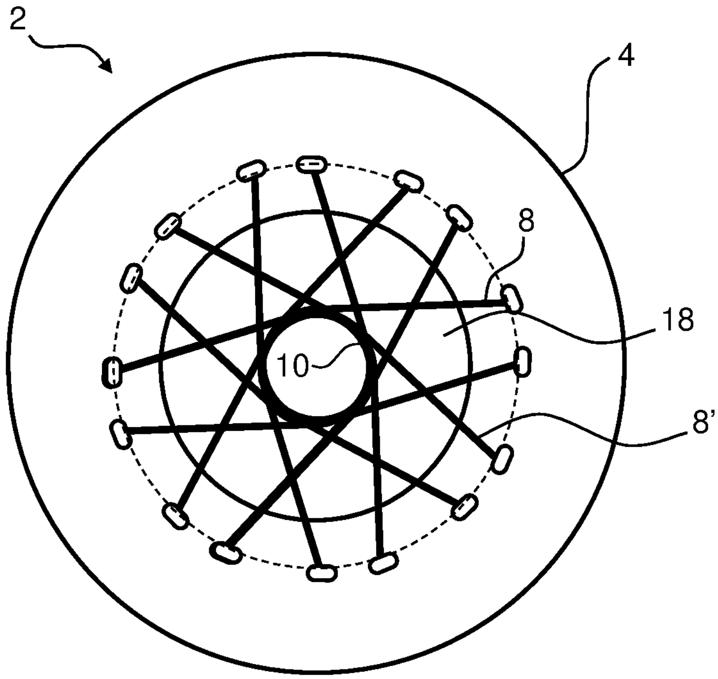
FIG. 10C shows a schematic top view of a drill pipe cleaning system according to an embodiment.

FIG. 10C illustrates a schematic top view of a drill pipe cleaning system 2 according to an embodiment. The drill pipe cleaning system 2 comprises a cleaning ring 4 provided with a centrally arranged ring opening 18 and eight cleaning belts 8, 8' arranged to engage with and hereby scrape the outer surface of the drill pipe 10. Accordingly, upon raising the drill pipe 10, the cleaning belts 8, 8' will scrape and thus clean the outside surface of the drill pipe 10.

The first belt 8 is attached to the cleaning ring 4 in a first mounting structure and a second mounting structure. The second belt 8' and the third belt 8'' are attached to the cleaning ring 4 in a similar manner. The first mounting structure is moveably arranged. By moving the first mounting structure from a first position to a second position, the tension in the cleaning belts is increased. Accordingly, the cleaning belts 8, 8' can be tightened by decreasing the distance between the first mounting structure and the second mounting structure.

Figure 11A:
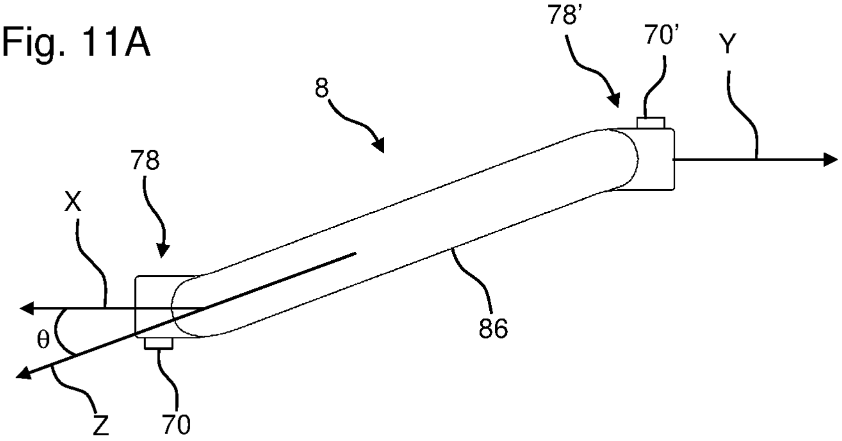
FIG. 11A shows a side view of a cleaning belt according to an embodiment.

FIG. 11A illustrates a side view of a cleaning belt 8 according to an embodiment. The cleaning belt 8 is suitable for use in a drill pipe cleaning system 2 according to the disclosure.

The cleaning belt 8 comprises a first end portion 78, in which a first bushing 70 is arranged. The cleaning belt 8 comprises a second end portion 78', in which a second bushing 70' is arranged. The bushings 70, 70' would typically be made of stainless steel.

The cleaning belt 8 comprises a cleaning section 86 extending between the first end portion 78 and the second end portion 78'. All parts of the cleaning belt 8 except for the bushings 70, 70' would typically be made of rubber. In an embodiment, all parts of the cleaning belt 8 except for the bushings 70, 70' are made from Neoprene rubber. In an embodiment, the hardness of the Neoprene rubber is in the range 45-55 Shore A. In an embodiment, the hardness of the Neoprene rubber is in the range 48-52 Shore A. In an embodiment, the hardness of the Neoprene rubber is 50 Shore A.

The first end portion 78 has a first longitudinal axis X. The second end portion 78' has a second longitudinal axis Y. The bushing 70 of the first end portion 78 extends perpendicular to longitudinal axis X of the first end portion 78. Likewise, the bushing 70' of the second end portion 78' extends perpendicular to longitudinal axis Y of the second end portion 78'.

The bushing 70 of the first end portion 78 protrudes only in one direction from the first end portion 78, in which the bushing 70 is mounted. Likewise. the bushing 70' of the second end portion 78' protrudes only in one direction from the second end portion 78', in which the bushing 70' is mounted. The bushings 70, 70' extend parallel to each other and protrude in different directions.

The cleaning section 86 has a longitudinal axis Z and the angle θ between the longitudinal axis Z of the cleaning section 86 and the longitudinal axis X of the first end portion 78 is in the range 10-40 degrees. The angle between the longitudinal axis Z of the cleaning section 86 and the longitudinal axis Y of the second end portion 78' corresponds to the angle θ between the longitudinal axis Z of the cleaning section 86 and the longitudinal axis X of the first end portion 78.

Figure 11B:
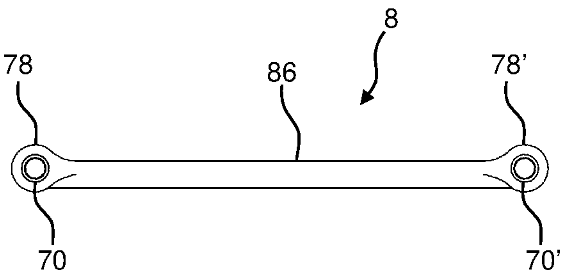
FIG. 11B shows a side view of the cleaning belt shown in FIG. 11A.

FIG. 11B illustrates a side view of the cleaning belt 8 shown in FIG. 11A.

Figure 11C:
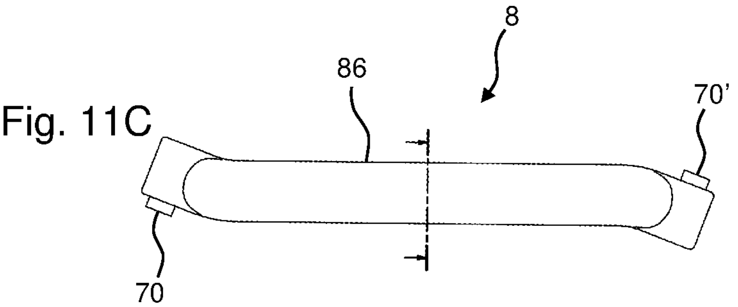
FIG. 11C shows another side view of the cleaning belt shown in FIG. 11A.

FIG. 11C illustrates another side view of the cleaning belt 8 shown in FIG. 11A.

FIG. 12A illustrates a cross-sectional view of the cleaning section 86 of the cleaning belt 2 shown in FIG. 11A. It can be seen that the cleaning section 86 is solid. The cleaning section 86 comprises a single arced contact member 80. The arced contact member 80 is configured to be brought into contact with and hereby clean the drill pipe 10 as indicated in FIG. 12C.

The cleaning belt 8 comprises an upper edge 82 and a lower edge 84, wherein the arced contact member 80 extends between the upper edge 82 and the lower edge 84. The upper edge 82 and the lower edge 84 extend parallel to each other. Moreover, the upper edge 82 and the lower edge 84 are straight.

In an embodiment, the arced contact member 80 is circularly arced, wherein the radius of curvature of the arced contact member is in the range 20-40 mm.

In an embodiment, the arced contact member 80 is circularly arced, wherein the radius of curvature of the arced contact member is in the range 25-35 mm.

FIG. 12B illustrates a perspective view of the cleaning belt 8 shown in FIG. 11A.

FIG. 12C illustrates a cross-sectional view of the cleaning belt 8 shown in FIG. 12A bearing against a drill pipe 10.

LIST OF REFERENCE NUMERALS

2 Drill pipe cleaning system
4 Cleaning ring
6 Opening
7 Side opening
8, 8', 8" Cleaning belt
10 Drill pipe
12 Motor
14 First mounting structure
16 Second mounting structure
18 Ring opening
20 Wellbore
22 Drilling rig
24 Drilling mud
26 Support structure
28 Air spraying nozzles
30 Liquid spraying nozzle
32 Liquid
34 Air (e.g. ambient air)
36 Axial surface
38 Toothed wheel
40 Liquid guiding, tubular ring-shaped member
42 Air guiding, tubular ring-shaped member
44 Handling tool
46 Attachment element
48 Attachment structure
50 Small opening
50' Large opening
52 Bottom plate
54 Liquid inlet
56 Air inlet
58 Handle
60 Rod
62 Plate portion
64 Reinforcement structure
66 Open configuration
68 Locked configuration
70, 70' Bushing
72 Ridge
74 Air conduit
76 Toothed wheel
78, 78' End portion
80 Contact member
82 Upper edge
84 Lower edge
86 Cleaning section
A First position
B Second position
α, β Angle

What is claimed is:

1. A drill pipe cleaning system, for cleaning of external surfaces of a drill pipe, comprising:
- a cleaning ring having a ring opening for receiving the drill pipe; and
- one or more cleaning belts arranged within the cleaning ring so as to engage an outer surface of the drill pipe;
- wherein each cleaning belt comprises a first end portion mounted to a first mounting structure and a second end portion mounted to a second mounting structure, each of the mounting structures moveably mounted to the cleaning ring,
- wherein a decrease of a distance between the first mounting structure and the second mounting structure results in the cleaning belt being tightened around the drill pipe,
- wherein the cleaning ring comprises a rotatably mounted toothed wheel and a motor having a gear that engages teeth of the toothed wheel.

2. The drill pipe cleaning system according to claim 1 comprising two or more cleaning belts vertically displaced from one another.

3. The drill pipe cleaning system according to claim 1, wherein the cleaning ring comprises one or more liquid spraying nozzles arranged and configured to spray a liquid towards the drill pipe.

4. The drill pipe cleaning system according to claim 3, wherein the liquid spraying nozzles are arranged along a liquid guiding, tubular ring-shaped member.

5. The drill pipe cleaning system according to claim 1, wherein the cleaning ring comprises one or more air spraying nozzles arranged and configured to spray air towards the drill pipe.

6. The drill pipe cleaning system according to claim 5, wherein the air spraying nozzles are arranged along an air guiding, tubular ring-shaped member.

7. The drill pipe cleaning system according to claim 1, wherein a side wall forms an outer circumference of the cleaning ring, wherein the side wall is ring-shaped and comprises a plurality of openings providing radial access to the cleaning ring.

8. The drill pipe cleaning system according to claim 1, wherein the cleaning ring comprises a tensioning assembly arranged and configured to increase the tension of the one or more cleaning belts.

9. The drill pipe cleaning system according to claim 1, wherein each of the cleaning belts comprises:
- the first end portion, in which a first bushing is arranged;
- the second end portion, in which a second bushing is arranged; and
- a cleaning section extending between the first end portion and the second end portion.

10. The drill pipe cleaning system to claim 9, wherein:
- the first end portion has a first longitudinal axis and the first bushing extends perpendicular to first longitudinal axis; and
- the second end portion has a second longitudinal axis and the second bushing extends perpendicular to the second longitudinal axis.

11. The drill pipe cleaning system according to claim 10, wherein:
- the first bushing extends perpendicularly only in a first direction from the first end portion; and
- the second bushing extends perpendicularly only in a second direction from the second end portion.

12. The drill pipe cleaning system according to claim 11, wherein the first direction and the second direction are opposite directions.

13. The drill pipe cleaning system according to claim 9, wherein the cleaning section comprises a single arced contact member that is configured to be brought into contact with the drill pipe.

14. A cleaning belt for use in the drill pipe cleaning system according to claim 1, the cleaning belt comprising:
- the first end portion, in which a first bushing is arranged;
- the second end portion, in which a second bushing is arranged; and
- a cleaning section extending between the first end portion and the second end portion.

15. The cleaning belt according to claim 14, wherein:

the first end portion has a first longitudinal axis and the first bushing extends perpendicular to first longitudinal axis; and the second end portion has a second longitudinal axis and the second bushing extends perpendicular to the second longitudinal axis.

16. The cleaning belt according to claim 15, wherein:

the first bushing extends perpendicularly only in a first direction from the first end portion; and the second bushing extends perpendicularly only in a second direction from the second end portion.

17. The cleaning belt according to claim 16, wherein the first direction and the second direction are opposite directions.

18. The cleaning belt according to claim 14, wherein the cleaning section comprises an upper edge, a lower edge, and an arced contact member extending between the upper edge and the lower edge.

19. The drill pipe cleaning system according to claim 1, wherein the first mounting structure is maintained attached to a first fixed position of the cleaning belt and the second mounting structure is maintained attached to a second fixed position of the cleaning belt.

20. The drill pipe cleaning system according to claim 1, wherein the cleaning belt has a rectangular cross section.

* * * * *